United States Patent [19]
Kinney et al.

[11] Patent Number: 5,922,992
[45] Date of Patent: Jul. 13, 1999

[54] ELECTRICAL WIRE CONNECTOR

[76] Inventors: D. Brooke Kinney, 355 Prospect Bay Dr., West Grasonville, Md. 21638; Douglas S. Kinney, 851 St. Edmonds Pl., Arnold, Mass. 21401

[21] Appl. No.: 08/869,235

[22] Filed: Jun. 4, 1997

Related U.S. Application Data

[60] Provisional application No. 60/019,241, Jun. 4, 1996.

[51] Int. Cl.$^6$ .................................................. H02G 15/04
[52] U.S. Cl. ................. 174/74 A; 174/74 R; 174/DIG. 8
[58] Field of Search ............................ 174/74 A, DIG. 8, 174/74 R, 75 B, 76

[56] References Cited

U.S. PATENT DOCUMENTS

| | | | |
|---|---|---|---|
| 3,243,211 | 3/1966 | Wetmore | 174/DIG. 8 X |
| 3,582,457 | 6/1971 | Barthell | 174/DIG. 8 X |
| 4,431,469 | 2/1984 | Falcomato | 174/DIG. 8 X |
| 4,576,871 | 3/1986 | Oestreich | 174/DIG. 8 X |
| 4,907,623 | 3/1990 | Kinney et al. | 174/DIG. 8 X |
| 4,993,149 | 2/1991 | Zilligen et al. | 174/DIG. 8 X |
| 5,137,478 | 8/1992 | Graf et al. | 174/DIG. 8 X |
| 5,143,761 | 9/1992 | Chiotis et al. | 174/DIG. 8 X |
| 5,298,300 | 3/1994 | Hosoi et al. | 174/DIG. 8 X |

*Primary Examiner*—Dean A. Reichard
*Attorney, Agent, or Firm*—Oldham & Oldham Co., L.P.A.

[57] ABSTRACT

Electrical wire connector for a twisted pair of electrical wire ends, wherein the electrical wire connector has a heat-shrinkable inner portion which will provide a water-tight, electrically-insulating covering of the electrically-conductive junction after the electrical wire connector is applied and heated. In preferred embodiments of the present invention, a heat-shrinkable inner portion is visually distinct from a non-heat-shrinkable outer portion, so that the action of the heat-shrinkable inner portion is visually observable.

19 Claims, 1 Drawing Sheet

ELECTRICAL WIRE CONNECTOR

This application claims benefit of United States provisional patent application Ser. No. 60/019,241 filed Jun. 4, 1996, and titled "Electrical Wire Connector."

BACKGROUND AND SUMMARY OF THE INVENTION

The present invention relates generally to a new and novel electrical wire connector for sealing the ends of a pair of joined electrical wires, the electrical wire connector providing a water-tight seal to the exposed electrical wire ends. More particularly, the present invention relates to a new and novel electrical wire connector which is formed from two (2) distinct polymeric materials, the first polymeric material being a heat-shrink polymer and the second polymeric material being a non-heat-shrink polymer. Even more particularly, the first polymeric material is provided on an inner portion of the formed electrical wire connector such that the first polymeric material is positioned over the connected electrical wires and, upon application of heat, the first polymeric material shrinks to conform to the electrical wires and provide a seal. In the most preferred embodiment of the present invention, the heat-shrink material and the non-heat-shrink material are visibly distinct, one from the other, so that the positive seal formed by heat-shrinking the first polymeric material is easily observable. One particular method of providing this visual distinctiveness is through the use of color on the heat-shrink material, while the non-heat-shrink material is substantially transparent.

It is well known in the electrical wiring art to field-connect a pair of electrical wires, in particular a pair of insulated electrical wires, by placing an exposed or uninsulated end of one electrical wire adjacent to the exposed or uninsulated end of the other electrical wire and hand twisting the exposed ends together to form an electrically-conductive junction. It is also well known to cover such an electrically-conductive junction with a water-tight and electrically-insulating connector, and such connectors are available in a variety of designs, many of which are secured in place by a further twisting of the electrical wires when the connector is applied. This further twisting may result in application of excessive twisting force, with consequent failure in the electrically-conductive junction. Also, such prior art twist-on connectors do not always provide visual confirmation that a positive seal has been achieved.

Particular uses of this type of wiring terminator include electric motors, in particular small electric motors, such as those commonly found in a variety of household appliances including refrigerators, washing machines and others.

Particular advantages of the present invention over known prior art devices include the ability to quickly visually observe that a proper seal of an electrical wire connection has been achieved, the ability to achieve enhanced abrasion resistance since the outer plies do not heat-shrink and increased dielectric constant. Additionally, the smooth nature of the outer plies provides a more attractive product. Since heat-shrink polymeric material is much more costly that the non-heat-shrink equivalent of the same polymeric material (the axial orientation process of the heat-shrink material adding significantly to the cost), the substitution of non-heat-shrink polymeric material for the outer shrink plies lowers the raw material cost of the final product.

It is, therefore, an object of the present invention to provide an improved electrical wire connector for a twisted pair of electrical wire ends, wherein the electrical wire connector has a heat-shrinkable inner portion which will provide a water-tight, electrically-insulating covering of the electrically-conductive junction after the electrical wire connector is applied and heated. In preferred embodiments of the present invention, the heat-shrinkable inner portion is visually distinct from a non-heat-shrinkable outer portion, so that the action of the heat-shrinkable inner portion is visually observable.

Other advantages and novel features of the present invention will become apparent in the following detailed description of the invention when considered in conjunction with the accompanying drawings.

DETAILED DESCRIPTION OF THE DRAWINGS

Figure 1:
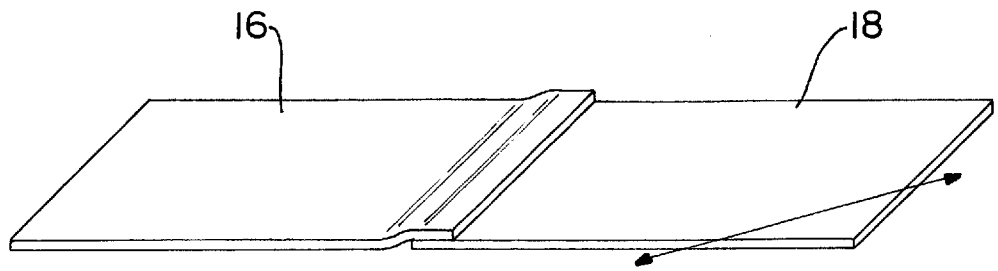
FIG. 1 is a perspective view of a joined strip of a first polymeric material and a second polymeric material which forms a sleeve open on one end thereof.
Figure 2:
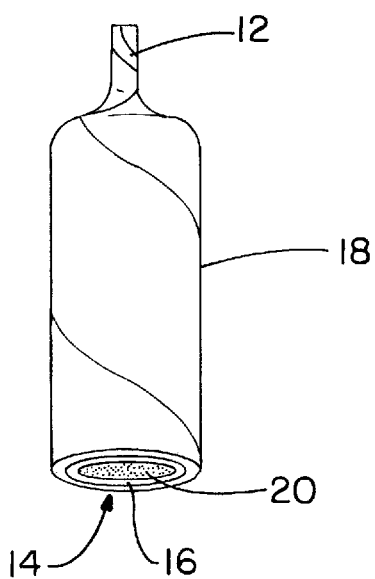
FIG. 2 is a front elevational view of a formed sleeve which is fabricated from the joined strip shown in FIG. 1.
Figure 3:
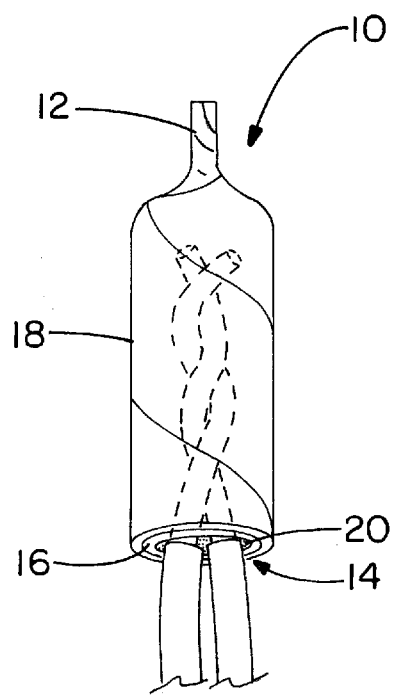
FIG. 3 is a front elevational view of the formed sleeve shown in FIG. 2 being used as an electrical wire connector in accordance with a preferred embodiment of the present invention in which the first polymeric material has been heat-shrunk in place over a twisted electrically-conductive junction of a pair of electrical wires.

In the following detailed description of a preferred embodiment of the present invention, reference is made to the accompanying drawings which, in conjunction with this detailed description, illustrate and describe a preferred embodiment of an electrical wire connector, generally identified by reference number 10, in accordance with a preferred embodiment of the present invention. Referring now to the drawings, in which like-referenced characters indicate corresponding elements throughout the several views, attention is directed to FIGS. 1 through 3, which are a perspective view of a joined strip of a first polymeric material and a second polymeric material which forms a sleeve open on one end thereof, a front elevational view of a formed sleeve which is fabricated from the joined strip shown in FIG. 1 and a front elevational view of the formed sleeve shown in FIG. 2 being used as an electrical wire connector in accordance with a preferred embodiment of the present invention in which the first polymeric material has been heat-shrunk in place over a twisted electrically-conductive junction of a pair of electrical wires, respectively.

Electrical wire connector 10 is a sleeve of polymeric material having crimped or sealed first end 12 and open second end 14. Electrical wire connector 10 is formed by spirally winding a plurality of strips of polymeric material upon a mandrel, the plurality of strips of polymeric material including at least one strip of first polymeric material 16 and at least one strip of second polymeric material 18. This spiral winding results in a tube similar in configuration to a soda straw. By sealing off or crimping one end of the tube, a closed end is provided to the sleeve, which then may be sized to a desired length by cutting. The spiral wound tube is formed by introducing separate strips of the plurality of strips of polymeric material onto a mandrel in parallel fashion, with the strips of polymeric material placed upon the mandrel in either a butting or a lapping relationship. The first strip of polymeric material applied to the mandrel forms the inner surface of the tube, upon which other strips of polymeric material are applied. Adhesive is placed upon the outer surface of each strip of polymeric material (as applied to the mandrel) prior to the spiral winding which is used to hold subsequent strips of polymeric material in place. As additional strips of polymeric material are applied, the additional strips of polymeric material are adhered atop the underlying strips of polymeric material to provide a multi-ply tube. In many applications, it is appropriate to apply a lubricant to the inner surface of the first strip of polymeric material applied to the mandrel to assist the first strip of polymeric material in rolling smoothly onto the mandrel without crinkling. Thermal means and pressure would be appropriate for sealing off the end of the tube once formed.

In the preferred embodiment of the present invention shown in the drawings, first polymeric material 16 is a film of a polyester, such as that sold commercially by DuPont under the trademark "MYLAR," and preferably has a thickness in the range of approximately 0.4 mils to approximately 2.0 mils. This polymeric material has been treated by an orientation process in which the polymeric material was stretched in at least one direction so the polymeric material will shrink when heated. Often the treatment is done in a pair of perpendicular directions so that the polymeric material shrinks along two (2) perpendicular axes when heated. Second polymeric material 18 is a film of a non-oriented polyester, such as that sold commercially by DuPont under the trademark "MYLAR," and preferably has a thickness in the range of approximately 0.4 mills to approximately 2.0 mils. Second polymeric material 18 will be recognizable to one having ordinary skill in the relevant art as not being subject to heat shrinkage. Other polymeric materials could be used as the respective first and second polymeric materials instead of polyester if desired, such as polypropylene, polystyrene and others. However, an important aspect of the present invention is that first polymeric material 16 is heat-shrinkable and second polymeric material 18 is not heat-shrinkable, even if the first and second polymeric materials represent untreated and treated versions of the same polymeric material, as described above. In some embodiments of the present invention, the first and second polymeric materials will be different polymeric materials, but first polymeric material 16 will be heat-shrinkable.

In the preferred embodiment of electrical wire connector 10 shown in the drawings, the strip of first polymeric material 16 and the strip of second polymeric material 18 will each be from approximately 0.25 to approximately 3 inches wide and approximately 6 inches long. When the strips of polymeric material are wound to form the sleeve, the diameter of the sleeve preferably ranges from approximately 0.05 to approximately 3 inches.

In preparing the strips of the first polymeric material, it is preferable to cut the heat-shrinkable polymeric material such that the length and width are not parallel to the axis or axes of orientation of the first polymeric material, so that the shrinkage of the first polymeric material will result in the best tightening of the first polymeric material in the sleeve upon the electrically-conductive junction being sealed. This may also be accomplished through a spiral winding of the first polymeric material.

In selecting the first and second polymeric materials for fabrication of the sleeve, it is preferred to use a colored material for the first polymeric material and a substantially transparent material for the second polymeric material. When this is done, the overall sleeve has a uniform color prior to shrinking of the heat-shrink material around the electrically-conductive junction, but after heat shrinkage, the inner portion fabricated from the first polymeric material is foreshortened, so that the end of the sleeve towards its open end is substantially clear rather than colored. In this manner, the effectiveness of the heat-shrink process upon the electrically-conductive junction is visually observable. The color of the first polymeric material, which often will appear somewhat striated in the oriented or stretched condition prior to shrinking, will intensify after heat shrinkage. In industrial applications, this ability to quickly and accurately identify positive identification of a good seal through the heat-shrink process would be of great benefit.

In some applications of the present invention, the objects of the invention may be achieved in an even more effective manner by the addition of adhesive material 20 to the internal surfaces of the inner rolled tube of first polymeric material 16, that is, the tube fabricated from heat-shrinkable polymeric material. When an electrical wire termination to be sealed is placed into the rolled tube of first polymeric material 16 and electrical wire connector 10 is placed under heat and/or pressure to effect a good seal, the heat and/or pressure used may also activate the adhesive material, allowing it to flow around the electrically-conductive junction and seal the exposed wires from the environment. Examples of adhesives which are found to be effective in this application include pressure sensitive adhesives which maintain their tackiness and free-flowing properties over a relatively wide temperature range. Adhesive 20 should be placed into the inner rolled tube in a manner which does not require sufficient heat to cause shrinkage of first polymeric material 16. One known method is to effectively extrude adhesive 20 into the tube formed on the mandrel by pumping it through a hollow mandrel having an open end or a plurality of circumferentially located apertures.

Although the present invention has been described above in detail, the same is by way of illustration and example only and is not to be taken as a limitation on the present invention. Accordingly, the scope and content of the present invention are to be defined only by the terms of the appended claims.

What is claimed is:

1. An electrical wire connector for sealing an electrically-conductive junction between electrical wires, said electrical wire connector comprising:

an inner portion fabricated from an oriented heat-shrinkable polymeric material; and an outer portion adjacent to and separable from said inner portion, said outer portion being fabricated from a non-heat-shrinkable non-oriented polymeric material.

2. The electrical wire connector of claim 1, wherein said inner portion and said outer portion each include a first end and a second end and said first end of said inner portion and said first end of said outer portion are crimped and sealed and said second end of said inner portion and said second end of said outer portion are open.

3. The electrical wire connector of claim 1, wherein said inner portion and said outer portion are visually distinct.

4. The electrical wire connector of claim 1, wherein said inner portion is fabricated from colored heat-shrinkable oriented polymeric material and said outer portion is fabricated from a substantially transparent polymeric material.

5. The electrical wire connector of claim 4, wherein said inner portion includes an inner cylindrical surface and at least a portion of said inner cylindrical surface of said inner portion has an adhesive applied thereto.

6. The electrical wire connector of claim 5, wherein said inner portion is fabricated from a heat-shrinkable oriented polyester material and said outer portion is fabricated from a non-oriented polyester material.

7. The electrical wire connector of claim 6, wherein said heat-shrinkable polyester material and said non-oriented polyester material each have a thickness in the range of 0.4 to 2.0 mils.

8. The electrical wire connector of claim 7, wherein said adhesive is a pressure sensitive adhesive.

9. The electrical wire connector of claim 8, wherein the orientation of said heat-shrinkable oriented polyester material is oblique to both the radial and axial directions of said inner portion.

10. The electrical wire connector of claim 2, wherein said inner portion and said outer portion are visually distinct.

11. The electrical wire connector of claim 2, wherein said inner portion is fabricated from colored heat-shrinkable polymeric material and said outer portion is fabricated from a substantially transparent polymeric material.

12. The electrical wire connector of claim 10, wherein said inner portion includes an inner cylindrical surface and at least a portion of said inner cylindrical surface has an adhesive applied thereto.

13. The electrical wire connector of claim 11, wherein said inner portion includes an inner cylindrical surface and at least a portion of said inner cylindrical surface has an adhesive applied thereto.

14. The electrical wire connector of claim 1, wherein said inner portion is fabricated from a heat-shrinkable oriented polyester material and said outer portion is fabricated from a non-oriented polyester material.

15. The electrical wire connector of claim 14, wherein said heat-shrinkable polyester material and said non-oriented polyester material each have a thickness in the range of 0.4 to 2.0 mils.

16. The electrical wire connector of claim 12, wherein said adhesive is a pressure sensitive adhesive.

17. The electrical wire connector of claim 16, wherein the orientation of said heat-shrinkable oriented polyester material is oblique to both the radial and axial directions of said inner portion.

18. The electrical wire connector of claim 1, wherein the orientation of said heat-shrinkable oriented polymeric material is oblique to both the radial and axial directions of said inner portion.

19. A method of providing a seal for an electrically-conductive junction between electrical wires, said method comprising the steps of:

providing an electrical wire connector having an inner portion fabricated from a colored heat-shrinkable polymeric material and an outer cylindrical portion adjacent to said inner portion, said outer portion being fabricated from a substantially transparent non-heat-shrinkable polymeric material;

placing said inner portion of said electrical wire connector over the electrically-conductive junction;

heating said inner portion of said electrical wire connector to cause said colored heat-shrinkable polymeric material to shrink and adhere to the electrically-conductive junction; and confirming that a seal has been achieved by visually observing that at least a portion of said substantially transparent non-heat-shrinkable polymeric material has separated from said colored heat-shrinkable polymeric material.

* * * * *